(12) United States Patent
Jheng et al.

(10) Patent No.: US 12,170,483 B2
(45) Date of Patent: Dec. 17, 2024

(54) HIGH EFFICIENCY POWER SUPPLY SYSTEM HAVING MULTIPLE PORTS

(71) Applicant: Richtek Technology Corporation, Hsinchu (TW)

(72) Inventors: Sin-Sian Jheng, Hsinchu (TW); Jiun-Jang Lin, Hsinchu (TW)

(73) Assignee: Richtek Technology Corporation, Hsinchu (TW)

( * ) Notice: Subject to any disclaimer, the term of this patent is extended or adjusted under 35 U.S.C. 154(b) by 25 days.

(21) Appl. No.: 18/321,755

(22) Filed: May 22, 2023

(65) Prior Publication Data

US 2024/0006995 A1 Jan. 4, 2024

(30) Foreign Application Priority Data

Jul. 4, 2022 (TW) .................................. 111124917

(51) Int. Cl.
*H02M 7/5387* (2007.01)
*H02M 1/00* (2006.01)
*H02M 3/158* (2006.01)

(52) U.S. Cl.
CPC ......... *H02M 3/158* (2013.01); *H02M 1/0067* (2021.05)

(58) Field of Classification Search
CPC ........................... H02M 3/158; H02M 1/0067
See application file for complete search history.

(56) References Cited

U.S. PATENT DOCUMENTS

2024/0048040 A1\* 2/2024 Lu ....................... H02M 1/0067
2024/0241993 A1\* 7/2024 Ouni ....................... G06F 21/72

\* cited by examiner

*Primary Examiner* — Jared Fureman
*Assistant Examiner* — Esayas G Yeshaw
(74) *Attorney, Agent, or Firm* — Huan-Yi Lin

(57) ABSTRACT

A power supply system providing a power conversion function for a system circuit includes first, second and third convertor circuits respectively including plural switches and first, second and third inductors. The first and second convertor circuits are coupled to first and second power supplies respectively through first and second ports of the system circuit. A third power supply is coupled to a battery module and an internal load circuit. The plural switches are configured to correspondingly switch the first to third inductors to perform power conversion between the first to third power supplies and an internal power bus of the system circuit. The voltage of the internal power bus is configured to be higher than any voltage of the first to third power supplies, such that a current of the internal power bus is lower than a third current of the third power supply.

16 Claims, 6 Drawing Sheets

US 12,170,483 B2

HIGH EFFICIENCY POWER SUPPLY SYSTEM HAVING MULTIPLE PORTS

CROSS REFERENCE

The present invention claims priority to TW 111124917 filed on Jul. 4, 2022.

BACKGROUND OF THE INVENTION

Field of Invention

The present invention relates to a power supply system, in particular a high-efficiency power supply system with multiple ports.

Description of Related Art

Please refer to FIG. 1A. FIG. 1A is a schematic diagram of a power supply system used in a notebook computer according to a prior art. As shown in FIG. 1A, when the conventional power supply system is used in a notebook computer, it usually has plural ports complying with universal serial bus (USB) specification, such as ports USB1~USB3, which are positioned on different sides of the notebook computer; for example in the notebook computer as shown in FIG. 1A, the port USB1 is positioned on the first side S1 of the notebook computer, and the port USB2 and the port USB3 are positioned on the second side S2 of the notebook computer.

Please refer to FIG. 1B. FIG. 1B shows a block diagram of a power supply system according to an embodiment of the prior art. As shown in FIG. 1B, the power supply system of the prior art includes a converter circuit 11, a converter circuit 12, and a converter circuit 13. The converter circuit 11, the converter circuit 12, and the converter circuit 13 are all buck-boost converters, which are configured to convert the voltage of the external power to the internal system voltage VSYS to supply power to the internal load circuit 15, or to supply power to the battery 16 of the internal system circuit through the switch 17. The converter circuit 11 is further used to control the switch 17.

Please refer to FIG. 1C. FIG. 1C shows a schematic diagram of a power supply system according to an embodiment of the prior art. In FIG. 1C, each of the converter circuit 11, the converter circuit 12, and the converter circuit 13 of the prior art includes one inductor and four switches to achieve the buck-boost conversion between the external power and the internal system voltage VSYS. The converter circuit 11 and the internal load circuit 15 are positioned on the main board 101 of the system circuit, and the converter circuit 12 and the converter circuit 13 are positioned on the secondary board 102 of the system circuit. The converter circuit 11 is configured to convert the voltage V1 of the external power to generate the voltage VS1; the converter circuit 12 is configured to convert the voltage V2 of the external power to generate the voltage VS2; and the converter circuit 13 is configured to convert the voltage V3 of the external power to generate the voltage VS2. The voltage VS1, the voltage VS2 and the voltage VS3 are commonly coupled to the internal system voltage VSYS to supply power to the internal load circuit 15, or to supply power to the battery 16 of the internal system circuit through the switch 17.

As shown in FIG. 1C, the converter circuit 12 and the converter circuit 13 positioned on the secondary board 102 are coupled to the ground potential of the main board 101 through the wires 18' and 19', respectively, and the voltage VS2 and the voltage VS3 are coupled to the internal system voltage VSYS through the wire 18 and the wire 19, respectively. The wire 18, the wire 18', the wire 19, and the wire 19' are long in length and have a parasitic resistance R11, a parasitic resistance R12, a parasitic resistance R13, and a parasitic resistance R14, respectively. Therefore, the feedback signal Vfsys2, the feedback signal Vfsys3, the ground signal Vgnd2, and the ground signal Vgnd3 need to be coupled to the converter circuit 12 or the converter circuit 13 via a node positioned in the main board 101 close to the internal system voltage VSYS and the ground potential.

The shortcomings of the above-mentioned prior art include at least the following. Each of the converter circuits 11, 12 and 13 has to use a buck-boost converter to accommodate different external power voltages and internal system voltages VSYS, when the voltages V1, V2 and V3 of the external power are greater than the voltages VS1, VS2 and VS3, currents flowing through the wire 18 and the wire 19 are relatively high, causing considerable power loss, and the wires require a larger cross-sectional area for carrying higher current. Besides, as mentioned above, the length of the wires 18, 18', 19 and 19' are relatively long, and these the wires 18, 18', 19 and 19' need corresponding feedback wires of the same length, which will occupy a very large area of the circuit board. Furthermore, the converter circuits 11, 12 and 13 require a large number of switches, and because there are high currents passing through the inductors and switches in these converter circuits 11, 12 and 13, the power supply system of the prior art need to use circuit components (such as inductors and switches, etc.) having higher specifications and larger sizes, thus occupying higher circuit board area and requiring higher manufacturing costs. To sum up, when the power supply system of the prior art is equipped with plural converter circuits, the occupied circuit board area is large and the power loss is large, the more the worse. In addition, in the power supply system of the prior art, there must be one converter circuit serving as a main control circuit to control the switch 17. For example, in the illustrated prior art, the converter circuit 11 is the main control circuit to control the switch 17, while the converter circuit 12 and the converter circuit 13 are the auxiliary circuits. The shortcoming is that the converter circuit serving as the main control circuit must be always in an operating state so that the system can operate.

In view of the above, the present invention aims at the above-mentioned shortcomings of the prior art, and proposes a high-efficiency power supply system with multiple ports, which not only reduces the number of switches in the converter circuit, but also lowers and required specifications of the inductors and switches in the converter circuit. Furthermore, the present invention greatly reduces the current in the power supply system, and does not need to couple the feedback signal to the converter circuit from a node positioned close to the internal system voltage, so the power loss, the cross-sectional area of the wire, and the number of wires can be greatly reduced, and the occupied circuit board area also can be greatly reduced. In addition, in the power supply system of the present invention, it is not required to assign one of the converter circuits as a main control circuit and the rest converter circuits as the auxiliary circuits, so the system can operate when any one or more of the converter circuits are in the operating state.

SUMMARY OF THE INVENTION

From one perspective, the present invention provides a power supply system, configured to provide a power conversion function for a system circuit, comprising: a first converter circuit, comprising a plurality of first switches and a first inductor, the first converter circuit being coupled to a first power through a first port of the system circuit, wherein the plurality of first switches of the first converter circuit are configured to operate the first inductor to perform power conversion between the first power and an internal bus power of the system circuit; a second converter circuit, comprising a plurality of second switches and a second inductor, the second converter circuit being coupled to a second power through a second port of the system circuit, wherein the plurality of second switches of the second converter circuit are configured to operate the second inductor to perform power conversion between the second power and the internal bus power of the system circuit; and a third converter circuit, comprising a plurality of third switches and a third inductor, wherein the plurality of third switches of the third converter circuit are configured to operate the third inductor to perform power conversion between the internal bus power of the system circuit and a third power the, wherein the third power is coupled to a battery module and an internal load circuit; wherein in a high dropout mode, an internal bus voltage of the internal bus power is set to be greater than a first voltage of the first power, a second voltage of the second power, and a third voltage of the third power, so that an internal bus current of the internal bus power is smaller than a third current of the third power.

In one embodiment, the first converter circuit is electrically connected to the third converter circuit by a first wire having a first preset length, and the third converter circuit is electrically connected to the internal load circuit or the battery module by a second wire having a second preset length, wherein the first preset length is greater than the second preset length.

In one embodiment, the first preset length is at least 10 times greater than the second preset length.

In one embodiment, a ratio of the internal bus voltage to the third voltage is relevant to a ratio of the first preset length to the second preset length.

In one embodiment, the third converter circuit and the internal load circuit are positioned on a main board of the system circuit, and the first converter circuit is positioned on a secondary load of the system circuit board. The first converter circuit and the third converter circuit are positioned on different sides of the system circuit, wherein the main board and the secondary board are connected by a flexible circuit board or an internal connection wire. A first sub-bus power generated by the first converter circuit is electrically connected to an internal bus connection end of the third converter circuit through the flexible circuit board or the internal connection wire, so as to provide the internal bus power to the third converter circuit, or to receive the internal bus power from the third converter circuit; wherein the first wire includes the flexible circuit board or the internal connection wire.

In one embodiment, the first converter circuit is positioned on a first side of the system circuit, and the second converter circuit is positioned on the main board and is positioned on a second side of the system circuit together with the third converter circuit, wherein the first port is positioned on the first side of the system circuit and the second port is positioned on the second side of the system circuit. In another embodiment, the second converter circuit is positioned on the secondary board and is positioned on the first side of the system circuit together with the first converter circuit, and the third converter circuit is positioned on the second side of the system circuit, wherein the first port and the second port are positioned on the first side of the system circuit.

In one embodiment, the second converter circuit and the first converter circuit are positioned on the first side of the system circuit, wherein the first sub-bus power generated by the first converter circuit and a second sub-bus power generated by the second converter circuit are first electrically connected to each other on the secondary board, and next electrically connected to the internal bus connection end of the third converter circuit through the flexible circuit board or the internal connection wire to generate the internal bus power.

In one embodiment, the system circuit is a notebook computer, and the first port and the second port conform to universal serial bus (USB) type-C port, wherein at least one of the first power, the second power and the third power is provided by a power supply device which is an electronic device compliant with the USB PD specification.

In one embodiment, the plurality of first switches of the first converter circuit comprise a first high-side switch and a first low-side switch. A first end of the first inductor, a first end of the first high-side switch and a first end of the first low-side switch are commonly coupled to a first switching node. A second end of the first inductor is coupled to the first power; a second end of the first high-side switch is coupled to the internal bus power; a second end of the first low-side switch is coupled to a ground potential. The first high-side switch and the first low-side switch are periodically switched complementarily according to a first duty cycle, so that the first end of the first inductor is switched between the internal bus power and the ground potential, thereby performing power conversion between the first power and the internal bus power. The plurality of second switches of the second converter circuit comprise a second high-side switch and a second low-side switch. A first end of the second inductor, a first end of the second high-side switch, and a first end of the second low-side switch are commonly coupled to a second switching node. A second end of the second inductor is coupled to the second power; a second end of the second high-side switch is coupled to the internal bus power; a second end of the second low-side switch is coupled to the ground potential. The second high-side switch and the second low-side switch are periodically switched complementarily according to a second duty cycle, so that the first end of the second inductor is switched between the internal bus power and the ground potential, thereby performing power conversion between the second power and the internal bus power. The plurality of third switches of the third converter circuit comprise a third high-side switch and a third low-side switch. A first end of the third inductor, a first end of the third high-side switch, and a first end of the third low-side switch are commonly coupled to a third switching node. A second end of the third inductor is coupled to the third power; a second end of the third high-side switch is coupled to the internal bus power; a second end of the third low-side switch is coupled to the ground potential. The third high-side switch and the third low-side switch are periodically switched complementarily according to a third duty cycle, so that the first end of the third inductor is switched between the internal bus power and the ground potential, thereby performing power conversion between the third power and the internal bus power.

In one embodiment, the first power and/or the second power are step-up converted into the internal bus power by the first converter circuit and/or the second converter circuit, and the internal bus power is step-down converted into the third power by the third converter circuit, whereby the first power and/or the second power supplies power to the internal load circuit and/or the battery module; or, the third power is step-up converted into the internal bus power by the third converter circuit, and the internal bus power is step-down converted into the first power and/or the second power by the first converter circuit and/or the second converter circuit, whereby the battery module of the system circuit supplies power to the first power, the second power, and/or the internal load circuit.

In one embodiment, when a voltage difference between the first voltage and the internal bus voltage is smaller than a corresponding preset threshold, the first converter circuit operates in a bypass mode; when a voltage difference between the second voltage and the internal bus voltage is smaller than a corresponding preset threshold, the second converter circuit operates in the bypass mode; and/or when a voltage difference between the internal bus voltage and the third voltage is smaller than a corresponding preset threshold, the third converter circuit operates in the bypass mode; wherein when the first converter circuit operates in the bypass mode, the plurality of first switches of the first converter circuit directly electrically connect the first voltage to the internal bus voltage; when the second converter circuit operates in the bypass mode, the plurality of second switches of the second converter circuit directly electrically connect the second voltage to the internal bus voltage; and when the third converter circuit operates in the bypass mode, the plurality of third switches of the third converter circuit directly electrically connect the third voltage to the internal bus voltage.

In one embodiment, when the first converter circuit operates in the bypass mode, the first high-side switch is constantly turned on, or the first converter circuit further comprises a first bypass switch coupled between the first power and the internal bus power, and the first bypass switch is turned on in the bypass mode; when the second converter circuit operates in the bypass mode, the second high-side switch is constantly turned on, or the second converter circuit further comprises a second bypass switch coupled between the second power and the internal bus power, and the second bypass switch is turned on in the bypass mode; and/or when the third converter circuit operates in the bypass mode, the third high-side switch is constantly turned on, or the third converter circuit further comprises a third bypass switch coupled between the third power and the internal bus power, and the third bypass switch is turned on in the bypass mode.

In one embodiment, the internal bus power comprises the first sub-bus power generated by the first converter circuit and a second sub-bus power generated by the second converter circuit, wherein the power supply system further comprises a control circuit for controlling a ratio between a first sub-bus current of the first sub-bus power and a second sub-bus current of the second sub-bus power to be a preset current ratio according to a first current sensing signal and a second current sensing signal, wherein the first current sensing signal is relevant to a first inductor current of the first inductor, and the second current sensing signal is relevant to a second inductor current of the second inductor.

In one embodiment, the preset current ratio is relevant to a first rated power of the first power and a second rated power of the second power, wherein the first port and the second port are ports conforming to USB type-C specification, wherein the first power and the second power are respectively provided by a first power supply and a second power supply, wherein the first rated power and the second rated power are obtained by communicating with the first power supply and the second power supply through a configuration channel of the first port and a configuration channel of the second port, respectively.

In one embodiment, each of the first converter circuit and the second converter circuit further comprises a conversion control circuit, wherein the conversion control circuit comprises: a feedback circuit, configured to generate a feedback signal according to a sub-bus power; a modulation error amplifier, configured to amplify a difference between the feedback signal and a reference signal to generate a modulation error signal; a pulse width modulation circuit, configured to generate a modulation signal in a pulse width modulation manner according to the modulation error signal, so as to control the corresponding plurality of switches; a gain-adjustable amplifying circuit, configured to generate a current amplified signal according to a sub-current sensing signal by amplifying the sub-current sensing signal with an adjustable gain; a shunt circuit, configured to generate a sub-balance adjustment signal at a current balance end according to the current amplified signal; and a current error amplifier, configured to amplify a difference between the sub-balance adjustment signal and the current amplified signal to generate a current error signal, so as to adjust the feedback signal; wherein the sub-bus power and the sub-current sensing signal corresponding to the first converter circuit are the first sub-bus power and the first current sensing signal, respectively; wherein the sub-bus power and the sub-current sensing signal corresponding to the second converter circuit are the second sub-bus power and the second current sensing signal, respectively; wherein the current balance end corresponding to the first converter circuit and the current balance end corresponding to the second converter circuit are coupled to each other, so that the sub-balance adjustment signal corresponding to the first converter circuit and the sub-balance adjustment signal corresponding to the second converter circuit are connected in a shunt connection to generate a balance adjustment signal, wherein each of the conversion control circuits adjusts the corresponding feedback signal according to the corresponding current error signal, thereby controlling the modulation signal corresponding to each of the conversion control circuits to adjust the ratio between the first sub-bus current and the second sub-bus current to be the preset current ratio; wherein the preset current ratio is determined according to a ratio of the adjustable gain corresponding to the first converter circuit to the adjustable gain corresponding to the second converter circuit.

In one embodiment, the shunt circuit comprises a diode, one of the current amplified signal corresponding to the first converter circuit and the current amplified signal corresponding to the second converter circuit, which has the highest voltage, is selected as the balance adjustment signal.

In one embodiment, the preset current ratio is one.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1A:
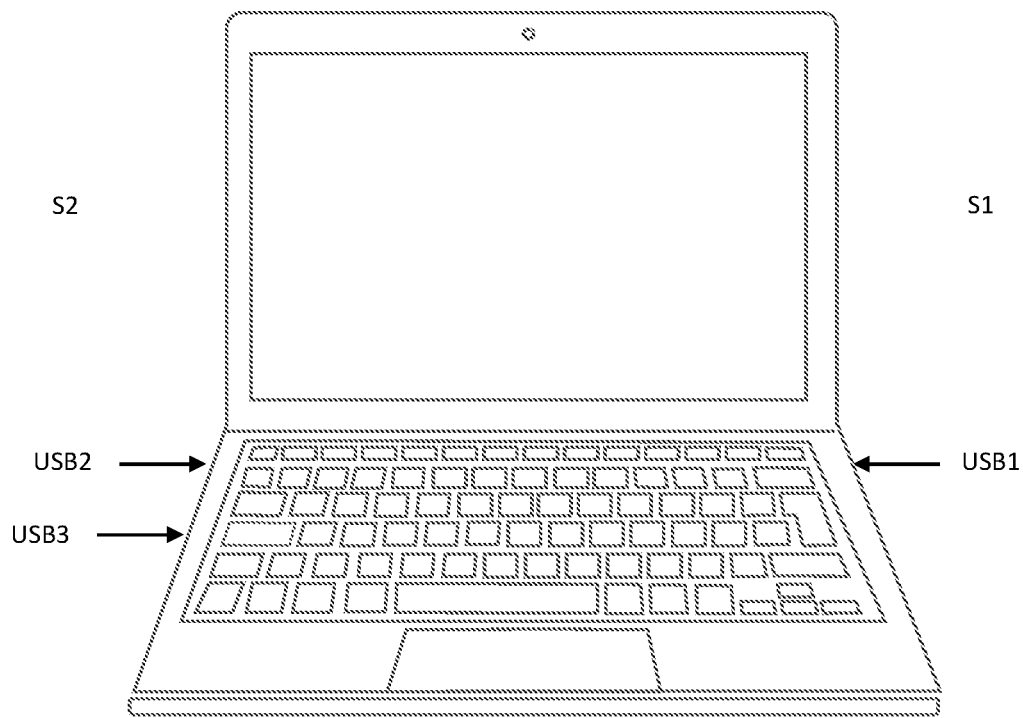
FIG. 1A is a schematic diagram of a power supply system used in a notebook computer according to a prior art.
Figure 1B:
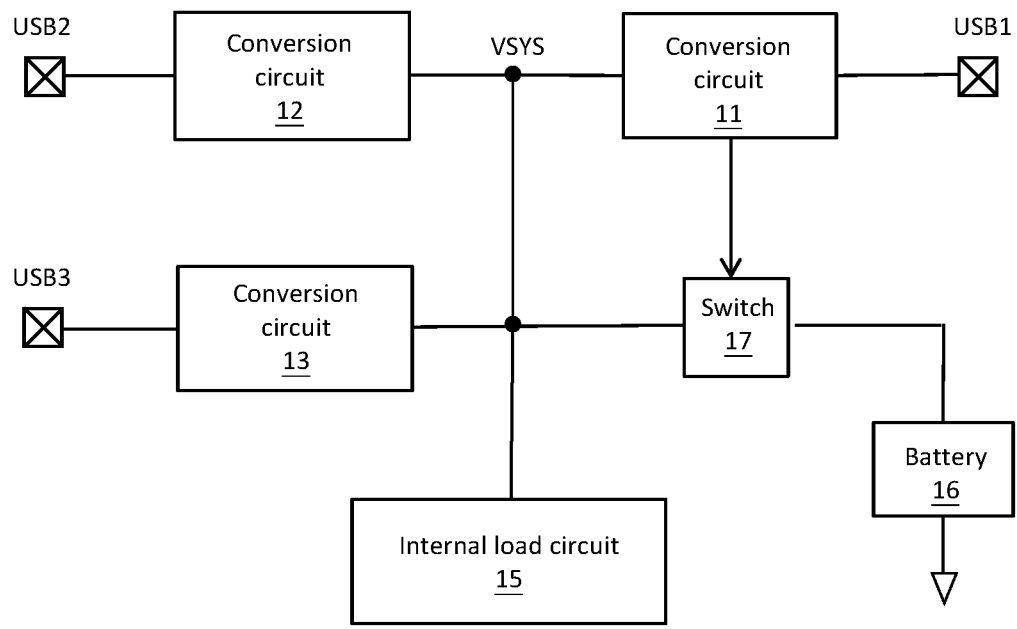
FIG. 1B is a block diagram of a power supply system according to an embodiment of the prior art.
Figure 1C:
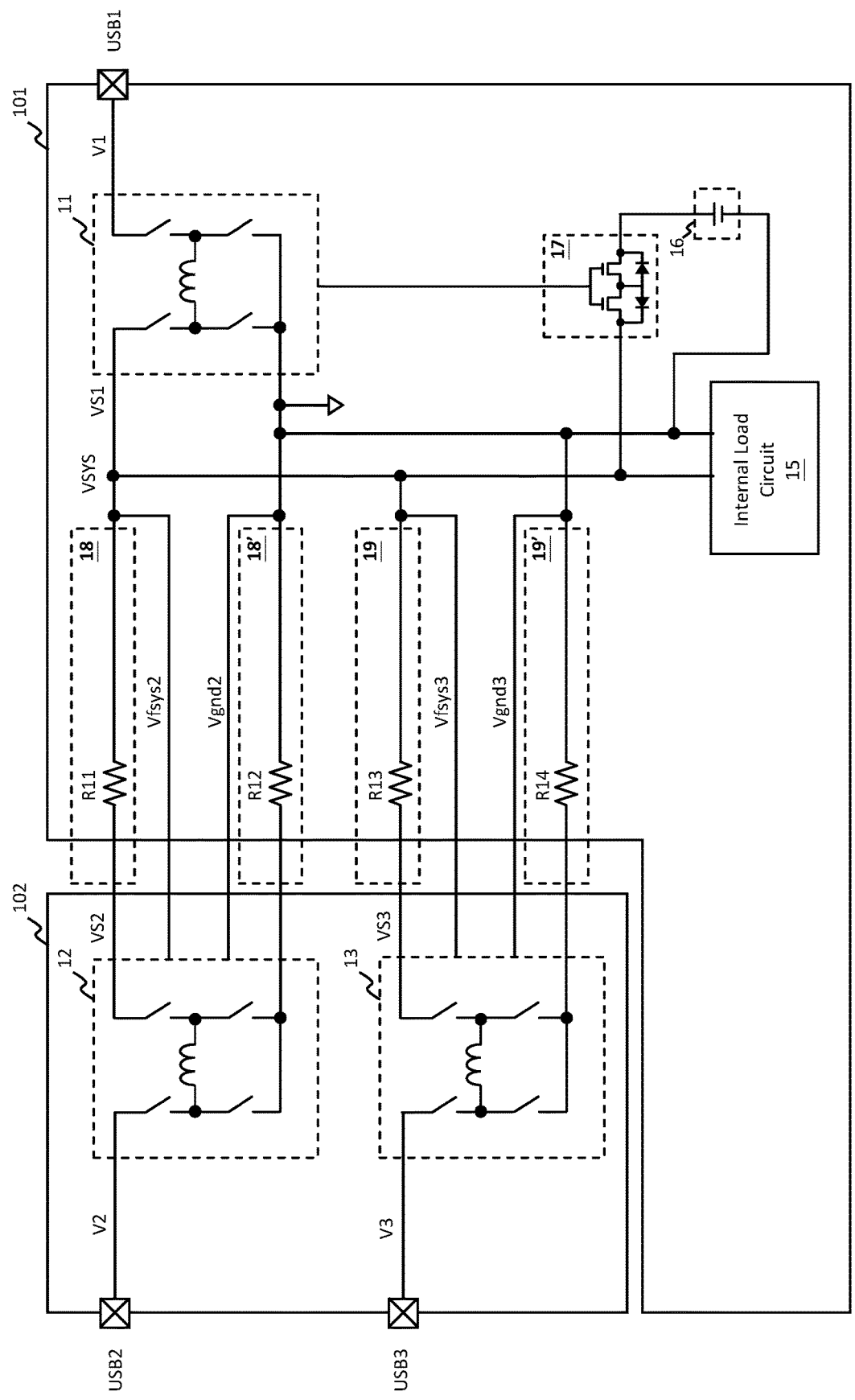
FIG. 1C is a schematic diagram of a power supply system according to an embodiment of the prior art.
Figure 2:
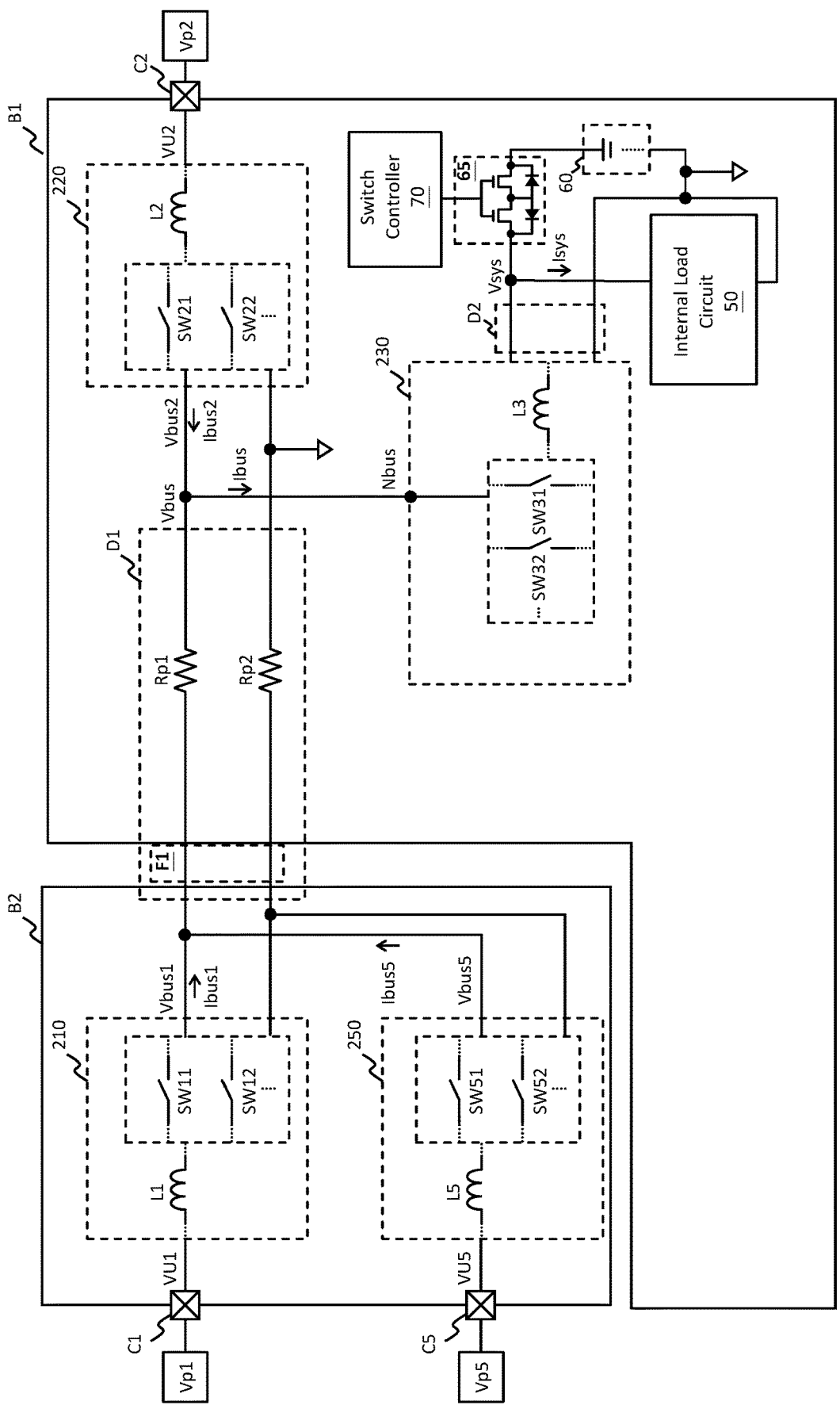
FIG. 2 is a block diagram of a power supply system and a system circuit according to an embodiment of the present invention.

Please refer to FIG. 2. FIG. 2 is a block diagram of a power supply system and a system circuit according to an embodiment of the present invention. As shown in FIG. 2, the power supply system of the present invention is configured to provide a power conversion function for a system circuit. In one embodiment, the system circuit is, for example, a notebook computer, including a main board B1 and a secondary board B2. In one embodiment, the power supply system of the present invention includes a converter circuit 210, a converter circuit 220, a converter circuit 230, and a converter circuit 250.

As shown in FIG. 2, in one embodiment, the converter circuit 220, the converter circuit 230, and the internal load circuit 50 are positioned on the main board B1 of the system circuit and on the first side of the system circuit (shown as the right side of system circuit shown in FIG. 2), wherein the port C2 is positioned on the first side of the system circuit, and the converter circuit 210 and the converter circuit 250 are positioned on the secondary board B2 of the system circuit and on the second side of the system circuit (shown as the left side of system circuit shown in FIG. 2), and the port C1 and the port C5 are positioned on the second side of the system circuit. For example, the first side is the right side and the second side is the left side. In one embodiment, the main board B1 and the secondary board B2 are connected by a connecting device F1. In one specific embodiment, the connecting device F1 is a flexible circuit board or an internal connection wire.

It should be noted that, in some embodiments, the converter circuit 220 may be omitted, and in some embodiments, the converter circuit 250 may be omitted. The following embodiments are described by taking the power supply system of the present invention including the converter circuit 210, the converter circuit 220, the converter circuit 230, and the converter circuit 250 as an example.

In one embodiment, the converter circuit 210 includes plural switches (such as switch SW11, switch SW12, etc.) and an inductor L1; the converter circuit 210 is coupled to the power supply Vp1 through the port C1 of the system circuit, and the plural switches of the converter circuit 210 are configured to operate the inductor L1 to perform power conversion between the power of the power supply Vp1 and the internal bus power of the system circuit. In one embodiment, the converter circuit 220 includes plural switches (such as switch SW21, switch SW22, etc.) and an inductor L2; the converter circuit 220 is coupled to the power supply Vp2 through the port C2 of the system circuit, and the plural switches of the converter circuit 220 are configured to operate the inductor L2 to perform power conversion between the power of the power supply Vp2 and the internal bus power of the system circuit. In one embodiment, the converter circuit 250 includes plural switches (such as switch SW21, switch SW22, etc.) and an inductor L5, the converter circuit 250 is coupled to the power supply Vp5 through the port C5 of the system circuit, and the plural switches of the converter circuit 250 are configured to operate the inductor L5 to perform power conversion between the power of the power supply Vp5 and the internal bus power of the system circuit. In one specific embodiment, the above-mentioned port C1, port C2, and/or port C5 are ports conforming to universal serial bus (USB) type-C.

In some embodiments, the power supply Vp1, the power supply Vp2, and the power supply Vp5 are power adapters, power banks, or other electronic devices that conform to the USB PD specification.

In one embodiment, the converter circuit 230 includes plural switches (such as switch SW31, switch SW32, etc.) and an inductor L3, and the plural switches of the converter circuit 230 are configured to switch the inductor L3 to perform power conversion between the internal bus power of the system circuit and the system power, wherein the system power is coupled to the battery module 60 and the internal load circuit 50 through the switch 65. In one embodiment, the switch controller 70 is configured to control the switch 65. In one embodiment, the battery module 60 includes at least one battery, and the internal load circuit 50 is, for example, a central processing unit (CPU). It should be noted that, in the present invention, the switch 65 is controlled by the switch controller 70, and therefore, among the converter circuit 210, the converter circuit 220, and the converter circuit 250, there is no distinction as to which one is the main control circuit and which other one is the auxiliary circuit; the power conversion between the external power and the internal bus power of the system circuit can be performed through anyone or more of the converter circuit 210, the converter circuit 220 and the converter circuit 250.

It should be noted that all of the converter circuit 210, the converter circuit 220, the converter circuit 250, and the converter circuit 230 can perform bidirectional power conversion. Specifically, in one embodiment, the converter circuit 210 can convert the power of the power supply Vp1 into the sub-bus power of the converter circuit 210, or convert the sub-bus power of the converter circuit 210 into the power of the power supply Vp1, wherein the sub-bus power of the converter circuit 210 includes the sub-bus voltage Vbus1 and the sub-bus current Ibus1. The converter circuit 220 can convert the power of the power supply Vp2 into the sub-bus power of the converter circuit 220, or convert the sub-bus power of the converter circuit 220 into the power of the power supply Vp2, wherein the sub-bus power of the converter circuit 220 includes the sub-bus voltage Vbus2 and the sub-bus current Ibus2. The converter circuit 250 can convert the power of the power supply Vp5 into the sub-bus power of the converter circuit 250, or convert the sub-bus power of the converter circuit 250 into the power of the power supply Vp5, wherein the sub-bus power of the converter circuit 250 includes the sub-bus voltage Vbus5 and the sub-bus current Ibus5. The converter circuit 230 can convert the internal bus power of the system circuit into the system power, or convert the system power to the internal bus power of the system circuit.

In the above embodiment, the sub-bus power of the converter circuit 210, the sub-bus power of the converter circuit 220, and the sub-bus power of the converter circuit 250 are commonly coupled to the internal bus power of the system circuit. In one embodiment, the sub-bus power of the converter circuit 210 and the sub-bus power of the converter circuit 250 are electrically connected to each other on the secondary board B2, and then electrically connected to the internal bus connection end Nbus of the converter circuit 230 in a pluggable/removable manner through the connecting device F1, thereby providing the internal bus power to the converter circuit 230, or receiving the internal bus power from the converter circuit 230.

Please continue referring to FIG. 2. In one embodiment, in a high dropout mode, the internal bus voltage Vbus of the internal bus power is set to be greater than the voltage VU1 of the power of the power supply Vp1, the voltage VU2 of the power of the power supply Vp2, the voltage VU5 of the power of the power supply Vp5, and the voltage Vsys of the system power, so that the internal bus current Ibus of the internal bus power is smaller than the current Isys of the system power, thereby reducing the power consumption caused by the internal bus current Ibus. It should be noted that, the internal bus current Ibus is substantially a sum of the sub-bus current Ibus1, the sub-bus current Ibus2, and the sub-bus current Ibus5, so the sub-bus current Ibus1, the sub-bus current Ibus2, and the sub-bus current Ibus5 are all smaller than the current Isys of the system power.

In one embodiment, the converter circuit 210 is electrically connected to the converter circuit 230 by a first wire D1 having a first preset length, and the converter circuit 230 is electrically connected to the internal load circuit 50 or the battery module 60 by a second wire D2 having a second preset length, wherein the first wire D1 includes the connecting device F1. The first preset length is greater than the second preset length, and a ratio of the internal bus voltage Vbus to the voltage Vsys of the system power is relevant to a ratio of the first preset length to the second preset length. In one specific embodiment, the first preset length is at least 10 times greater than the second preset length. It should be noted that although the first wire D1 still has a parasitic resistance Rp1 and a parasitic resistance Rp2, and the first preset length is greater than the second preset length, however, since the internal bus current Ibus, the sub-bus current Ibus1, the sub-bus current Ibus2 and the sub-bus current Ibus5 are quite small, the power loss caused by the internal bus current Ibus is not high, and the first wire D1 can use a wire having a smaller cross-sectional area. Thus, as compared to the prior art, the present invention can greatly reduce the power consumption and the occupied circuit board are. In addition, due to low power loss, the feedback signal does not need to be coupled by a node positioned close to the internal bus power, so the number of the wires from the secondary board B2 to the main board B1 can be greatly reduced; this is even more beneficial when the power supply system of the present invention includes more converter circuits because more wires are saved.

Figure 3:
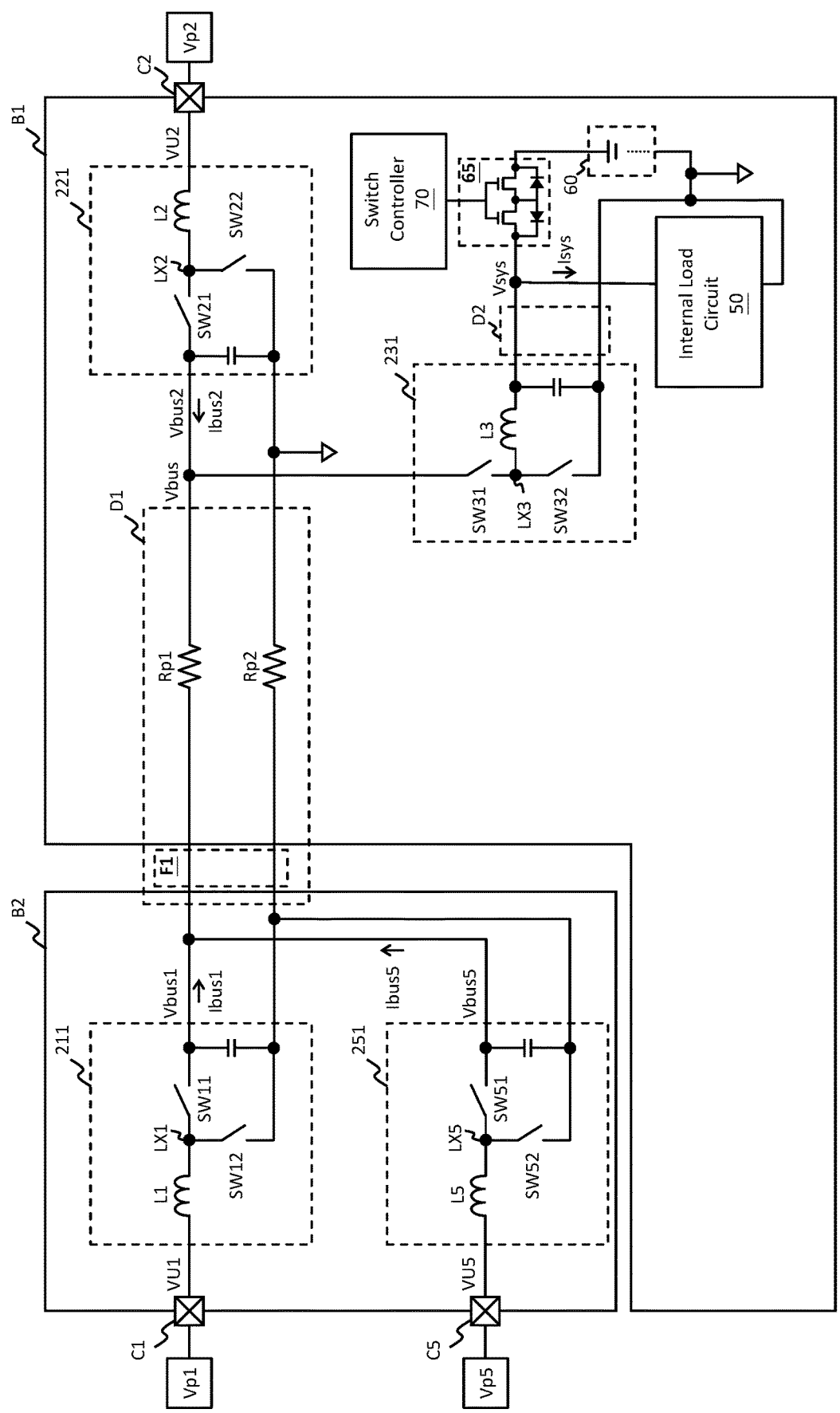
FIG. 3 is a schematic diagram of a power supply system and a system circuit according to an embodiment of the present invention.

Please refer to FIG. 3. FIG. 3 shows a schematic diagram of a power supply system and a system circuit according to an embodiment of the present invention. The system circuit shown in FIG. 3 is similar to the system circuit shown in FIG. 2, wherein the converter circuit 211 shown in FIG. 3 corresponds to the converter circuit 210 shown in FIG. 2, the converter circuit 221 shown in FIG. 3 corresponds to the converter circuit 220 shown in FIG. 2, the converter circuit 251 shown in FIG. 3 corresponds to the converter circuit 250 shown in FIG. 2, and the converter circuit 231 shown in FIG. 3 corresponds to the converter circuit 230 shown in FIG. 2. It should be noted that, in FIG. 3, in some embodiments, the converter circuit 221 may be omitted, and in some embodiments, the converter circuit 251 may be omitted. The following description takes the power supply system of the present invention including the converter circuit 211, the converter circuit 221, the converter circuit 231, and the converter circuit 251 as an example.

In one specific embodiment, as shown in FIG. 3, the plural switches of the converter circuit 211 include a switch SW11 and a switch SW12, wherein the switch SW11 corresponds to the high-side switch of the converter circuit 211, and the switch SW12 corresponds to the low-side switch of the converter circuit 211. The first end of the inductor L1, the first end of the switch SW11; the first end of the switch SW12 are commonly coupled to the switching node LX1, and the second end of the inductor L1 is coupled to the power of the power supply Vp1 through the port C1; the second end of the switch SW11 is coupled to the internal bus power; and the second end of the switch SW12 is coupled to the ground potential. In one embodiment, the switch SW11 and the switch SW12 are periodically switched complementarily according to a duty ratio, so that the first end (switching node LX1) of the inductor L1 is switched between the internal bus power and the ground potential, thereby performing power conversion between the power of the power supply Vp1 and the internal bus power. For example, by switching the first end of the inductor L1 (switching node LX1) between the internal bus power and the ground potential, the power of the power supply Vp1 is step-up converted into the internal bus power, or the internal bus power is step-down converted into the power of the power supply Vp1.

In one specific embodiment, the plural switches of the converter circuit 221 include a switch SW21 and a switch SW22, wherein the switch SW21 corresponds to the high-side switch of the converter circuit 221, and the switch SW22 corresponds to the low-side switch of the converter circuit 221. The first end of the inductor L2, the first end of the switch SW21, and the first end of the switch SW22 are commonly coupled to the switching node LX2; the second end of the inductor L2 is coupled to the power of the power supply Vp2 through the port C2; the second end of the switch SW21 is coupled to the internal bus power; and the second end of the switch SW22 is coupled to the ground potential. In one embodiment, the switch SW21 and the switch SW22 are periodically switched complementarily according to the duty ratio, so that the first end (switching node LX2) of the inductor L2 is switched between the internal bus power and the ground potential, thereby performing power conversion between the power of the power supply Vp2 and the internal bus power. For example, by switching the first end of the inductor L2 (switching node LX2) between the internal bus power and the ground potential, the power of the power supply Vp2 is step-up converted into the internal bus power, or the internal bus power is step-down converted into the power of the power supply Vp2.

In one specific embodiment, the plural switches of the converter circuit 251 include a switch SW51 and a switch SW52, wherein the switch SW51 corresponds to the high-side switch of the converter circuit 251, and the switch SW52 corresponds to the low-side switch of the converter circuit 251. The first end of the inductor L5, the first end of the switch SW51, and the first end of the switch SW52 are commonly coupled to the switching node LX5; the second end of the inductor L5 is coupled to the power of the power supply Vp5 through the port C5; the second end of the switch SW51 is coupled to the internal bus power; and the second end of the switch SW52 is coupled to the ground potential. In one embodiment, the switch SW51 and the switch SW52 are periodically switched complementarily according to the duty ratio, so that the first end (switching node LX5) of the inductor L5 is switched between the internal bus power and the ground potential, thereby performing power conversion between the power of the power supply Vp5 and the internal bus power. For example, by switching the first end of the inductor L5 (switching node LX5) between the internal bus power and the ground potential, the power of the power supply Vp5 is step-up converted into the internal bus power, or the internal bus power is step-down converted into the power of the power supply Vp5.

In one specific embodiment, the plural switches of the converter circuit 231 include a switch SW31 and a switch SW32, wherein the switch SW31 corresponds to the high-side switch of the converter circuit 251, and the switch SW32 corresponds to the low-side switch of the converter circuit 251. The first end of the inductor L3, the first end of the switch SW31, and the first end of the switch SW32 are commonly coupled to the switching node LX3; the second end of the inductor L3 is coupled to the system power; the second end of the switch SW31 is coupled to the internal bus power; and the second end of the switch SW32 is coupled to the ground potential. In one embodiment, the switch SW31 and the switch SW32 are periodically switched complementarily according to the duty ratio, so that the first end (switching node LX3) of the inductor L3 is switched between the internal bus power and the ground potential, thereby performing power conversion between the system power and the internal bus power. For example, by switching the first end of the inductor L3 (switching node LX3) between the internal bus power and the ground potential, the internal bus power is step-down converted into the system power, or the system power is step-up converted into the internal bus power.

Please continue referring to FIG. 3; the power supply system of the present invention can convert one or more external powers into the system power of the system circuit by one or more converter circuits, or it can convert the system power into one or more external powers by one or more converter circuits. Specifically, in one embodiment, the power of the power supply Vp1, the power of the power supply Vp2, and/or the power of the power supply Vp5 can be step-up converted into the internal bus power by the converter circuit 211, the converter circuit 221, and/or the converter circuit 251 (that is, the converter circuit 211, the converter circuit 221, and/or the converter circuit 251 act as boost converters), and converter circuit 231 is configured to step-down convert the internal bus power into system power (that is, the converter circuit 231 acts as a buck converter), whereby the power of the power supply Vp1, the power of the power supply Vp2, and/or the power of the power supply Vp5 supplies power to the internal load circuit 50 and/or the battery module 60. In one embodiment, the system power is step-up converted into the internal bus power by the converter circuit 231, and the converter circuit 211, the converter circuit 221 and/or the converter circuit 251 are configured to step-down convert the internal bus power into the power of the power supply Vp1, the power of the power supply Vp2, and/or the power of the power supply Vp5, whereby the battery module 60 of the system circuit supplies power to the power supply Vp1, the power supply Vp2, the power supply Vp5, and/or the internal load circuit 50.

Still referring to FIG. 3, in one embodiment, the converter circuit 211, the converter circuit 221, the converter circuit 251 and/or the converter circuit 231 can operate in a bypass mode, thereby reducing switching losses. Specifically, in one embodiment, (1) when the voltage difference between the voltage VU1 and the internal bus voltage Vbus is smaller than a preset threshold, the converter circuit 211 operates in the bypass mode; in this case the switch SW11 is constantly turned on, so that the voltage VU1 is electrically connected to the internal bus voltage; (2) when the voltage difference between the voltage VU2 and the internal bus voltage Vbus is smaller than a preset threshold, the converter circuit 221 operates in the bypass mode; in this case the switch SW21 is constantly turned on, so that the voltage VU2 is electrically connected to the internal bus voltage; (3) when the voltage difference between the voltage VU5 and the internal bus voltage Vbus is smaller than a preset threshold, the converter circuit 251 operates in the bypass mode; in this case the switch SW51 is constantly turned on, so that the voltage VU5 is electrically connected to the internal bus voltage; and/or (4) when the voltage difference between the internal bus voltage Vbus and the voltage Vsys of the system power is smaller than a preset threshold, the converter circuit 231 operates in the bypass mode; in this case the switch SW31 is constantly turned on, so that the voltage Vsys of the system power is electrically connected to the internal bus voltage.

Figure 4:
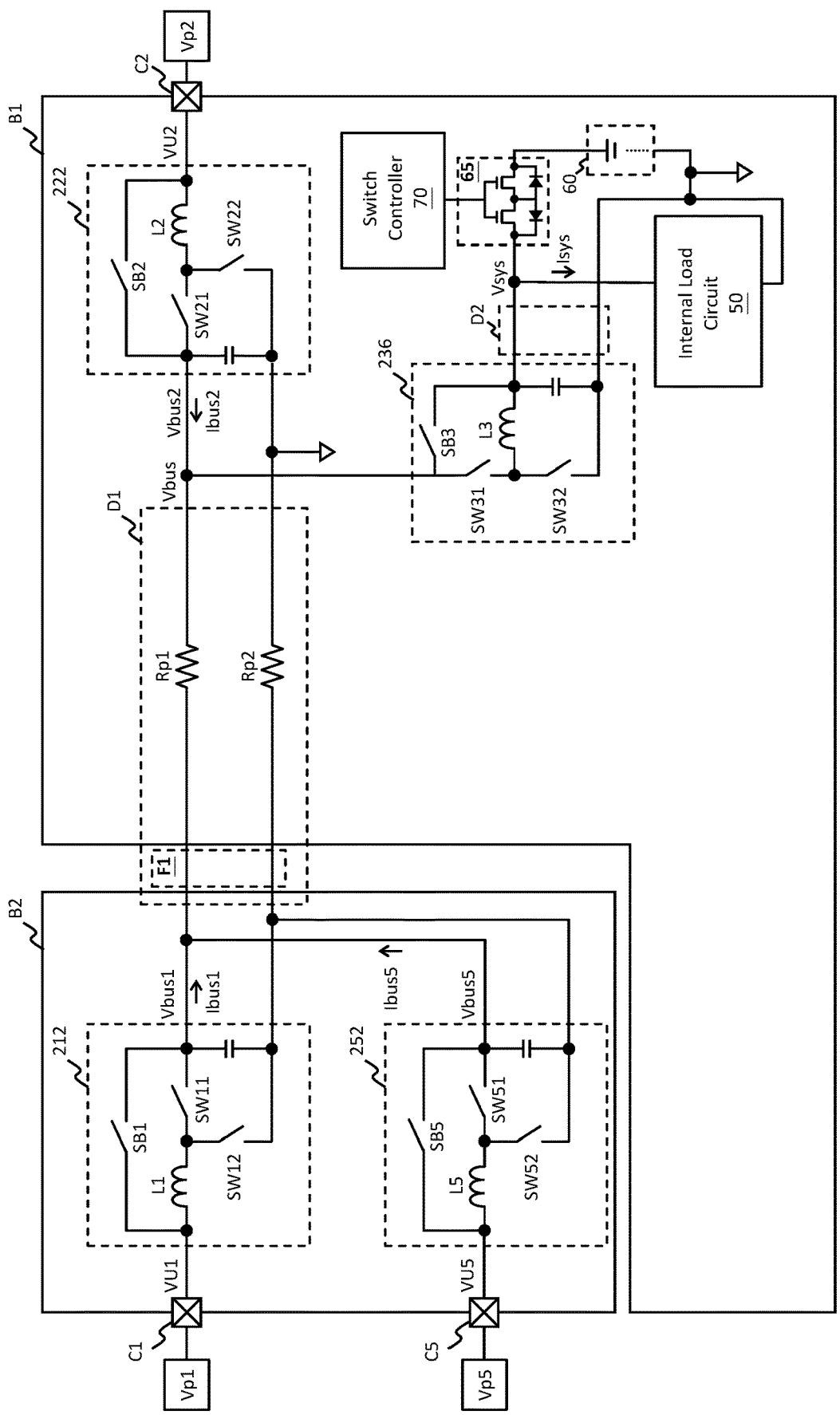
FIG. 4 is a schematic diagram of a power supply system and a system circuit according to an embodiment of the present invention.

Please refer to FIG. 4. FIG. 4 shows a schematic diagram of a power supply system and a system circuit according to an embodiment of the present invention. The system circuit shown in FIG. 4 is similar to the system circuit shown in FIG. 3, but the embodiment of FIG. 4 is different in that, in the embodiment shown in FIG. 4, the converter circuit 212 further includes a bypass switch SB1 coupled between the power of the power supply Vp1 and the internal bus power of the system circuit; the converter circuit 222 further includes a bypass switch SB2 coupled between the power of the power supply Vp2 and the internal bus power of the system circuit; the converter circuit 252 further includes a bypass switch SB5 coupled between the power of the power supply Vp5 and the internal bus power of the system circuit; and the converter circuit 232 further includes a bypass switch SB3 coupled between the internal bus power of the system circuit and the system power. In one embodiment, the converter circuit 212, the converter circuit 222, the converter circuit 252, and/or the converter circuit 232 can operate in the bypass mode, thereby reducing switching losses. It should be noted that, in FIG. 4, in some embodiments, the converter circuit 222 may be omitted, and in some embodiments, the converter circuit 252 may be omitted. The following description takes the power supply system of the present invention including the converter circuit 212, the converter circuit 222, the converter circuit 232, and the converter circuit 252 as an example.

Specifically, in one embodiment, when the voltage difference between the voltage VU1 and the internal bus voltage Vbus is smaller than the preset threshold, the converter circuit 212 operates in the bypass mode, wherein the bypass switch SB1 is turned on, so that the voltage VU1 is electrically connected to the internal bus voltage; when the voltage difference between the voltage VU2 and the internal bus voltage Vbus is smaller than the preset threshold, the converter circuit 222 operates in the bypass mode, wherein the bypass switch SB2 is turned on, so that the voltage VU2 is electrically connected In the internal bus voltage; when the voltage difference between the voltage VU5 and the internal bus voltage Vbus is smaller than the preset threshold, the converter circuit 252 operates in the bypass mode, wherein the bypass switch SB5 is turned on, so that the voltage VU5 is electrically connected to the internal bus voltage; and/or, when the voltage difference between the internal bus voltage Vbus and the voltage Vsys of the system power is smaller than the preset threshold, the converter circuit 232 operates in the bypass mode, wherein the bypass switch SB3 is turned on, so that the voltage Vsys of the system power is electrically connected to the internal bus voltage.

Figure 5:
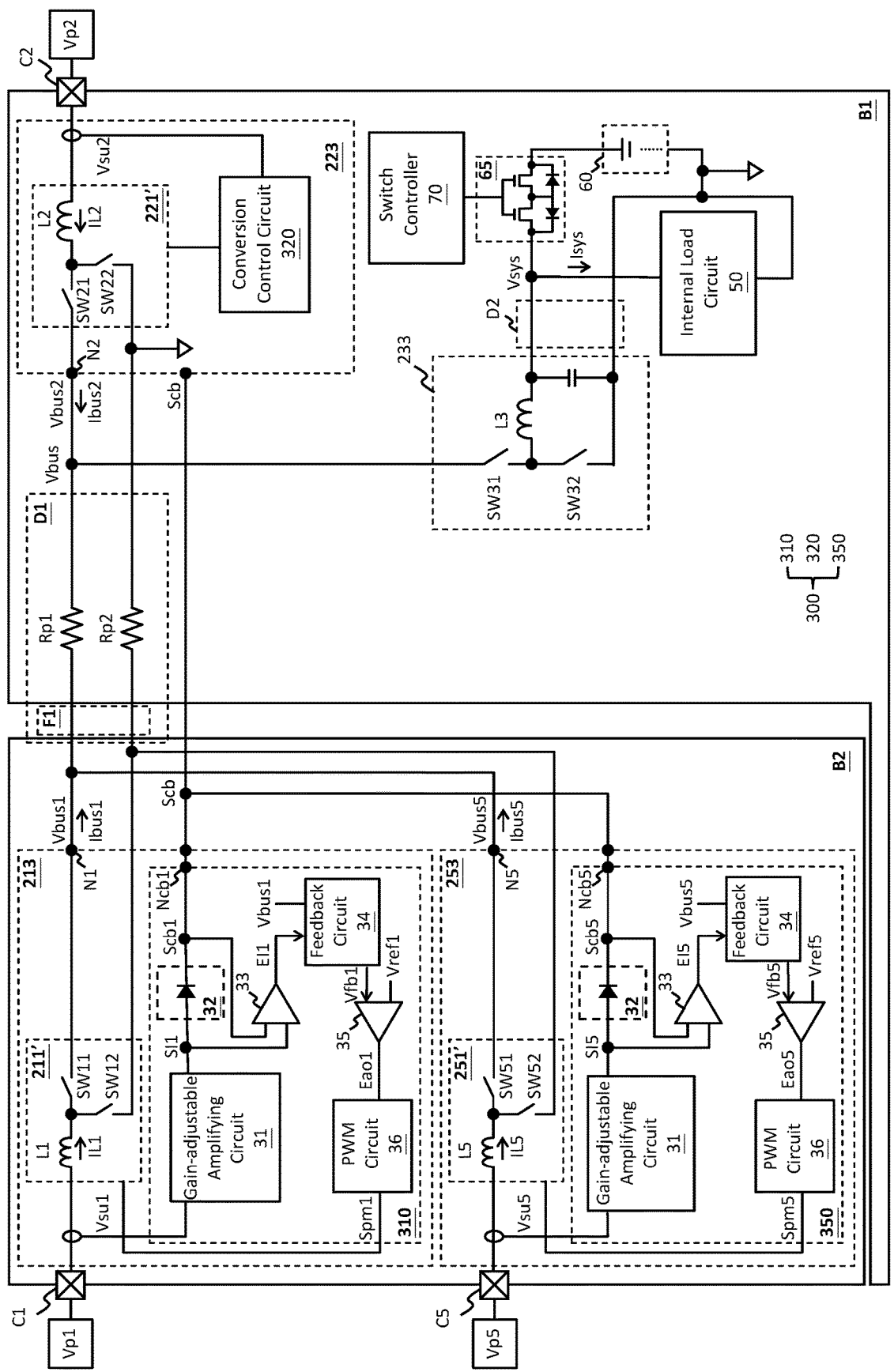
FIG. 5 is a schematic diagram of a power supply system and a system circuit according to an embodiment of the present invention.

Please refer to FIG. 5. FIG. 5 shows a schematic diagram of a power supply system and a system circuit according to an embodiment of the present invention. The system circuit shown in FIG. 5 is similar to the system circuit shown in FIG. 3. In one embodiment, the power supply system shown in FIG. 5 includes a converter circuit 213, a converter circuit 223, a converter circuit 253, and a converter circuit 233. The converter circuit 213 includes a sub-converter circuit 211', and the sub-converter circuit 211' corresponds to the converter circuit 211 shown in FIG. 3; the converter circuit 223 includes the sub-converter circuit 221', and the sub-converter circuit 221' corresponds to the converter circuit 221 shown in FIG. 3; the converter circuit 253 includes the sub-converter circuit 251', and the sub-converter circuit 251' corresponds to the converter circuit 251 shown in FIG. 3; the converter circuit 233 corresponds to the converter circuit 231 shown in FIG. 3. It should be noted that, in some embodiments, the converter circuit 223 may be omitted, and in some embodiments, the converter circuit 253 may be omitted. The following description takes the power supply system of the present invention including the converter circuit 213, the converter circuit 223, the converter circuit 253, and the converter circuit 233 as an example.

In one embodiment, the internal bus power includes a sub-bus power (sub-bus power on node N1) generated by sub-converter circuit 211', a sub-bus power (sub-bus power on node N2) generated by sub-converter circuit 221', and a sub-bus power (sub-bus power on node N5) generated by the sub-converter circuit 251'. In one embodiment, the power supply system shown in FIG. 5 further includes a control circuit 300 for controlling a ratio among the sub-bus current Ibus1 of the sub-bus power on the node N1, the sub-bus current Ibus2 of the sub-bus power on the node N2, and the sub-bus current Ibus5 of the sub-bus power on the node N5 to be a preset current ratio according to the current sensing signal Vsu1, the current sensing signal Vsu2, and the current sensing signal Vsu5, wherein the current sensing signal Vsu1 is relevant to the inductor current IL1 of the inductor L1, the current sensing signal Vsu2 is relevant to the inductor current IL2 of the inductor L2, and the current sensing signal Vsu5 is relevant to the inductor current IL5 of the inductor L5.

In one embodiment, the above-mentioned preset current ratio is relevant to the rated power of the power supply Vp1, the rated power of the power supply Vp2, and the rated power of the power supply Vp5, wherein the above-mentioned rated powers are obtained by communicating with the power supply Vp1, the power supply Vp2, and the power supply Vp5 through a configuration channel via the port C1, a configuration channel via the port C2, and a configuration channel via the port C5, respectively.

Please continue referring to FIG. 5, in one embodiment, the control circuit 300 includes a conversion control circuit 310, a conversion control circuit 320, and a conversion control circuit 350. In one embodiment, the converter circuit 213 further includes a conversion control circuit 310; the converter circuit 223 further includes a conversion control circuit 320; and the converter circuit 253 further includes a conversion control circuit 350. In one embodiment, each of the conversion control circuit 310, the conversion control circuit 320, and the conversion control circuit 350 includes a gain-adjustable amplifying circuit 31, a shunt circuit 32, a current error amplifier 33, a feedback circuit 34, a modulation error amplifier 35, and a pulse width modulation circuit 36. The conversion control circuit 310 and the conversion control circuit 350 will be explained below as examples, while the conversion control circuit 320 operates similarly and will not be explained in detail, and the details of the conversion control circuit 320 are not shown in FIG. 5 for simplicity of the drawing.

In one embodiment, in the conversion control circuit 310, the feedback circuit 34 is configured to generate the feedback signal Vfb1 according to the sub-bus power on the node N1. The modulation error amplifier 35 is configured to amplify a difference between the feedback signal Vfb1 and the reference signal Vref1 to generate the modulation error signal Eao1. The pulse width modulation circuit 36 is configured to generate the modulation signal Spm1 in a pulse width modulation manner according to the modulation error signal Eao1, so as to control the switch SW11 and the switch SW12. The gain-adjustable amplifying circuit 31 is configured to generate a current amplified signal SI1 according to a sub-current sensing signal Vsu1 by amplifying the sub-current sensing signal Vsu1 with an adjustable gain. The shunt circuit 32 is configured to generate a sub-balance adjustment signal Scb1 at a current balance end Ncb1 according to the current amplified signal SI1 (by way of unidirectional conduction, for example). The current error amplifier 33 is configured to amplify a difference between the sub-balance adjustment signal Scb1 and the current amplified signal SI1 to generate a current error signal EI1, so as to adjust the feedback signal Vfb1.

In one embodiment, in the conversion control circuit 350, the feedback circuit 34 is configured to generate the feedback signal Vfb5 according to the sub-bus power on the node N5. The modulation error amplifier 35 is configured to amplify a difference between the feedback signal Vfb5 and the reference signal Vref5 to generate the modulation error signal Eao5. The pulse width modulation circuit 36 is configured to generate the modulation signal Spm5 in a pulse width modulation manner according to the modulation error signal Eao5, so as to control the switch SW51 and the switch SW52. The gain-adjustable amplifying circuit 31 is configured to generate a current amplified signal SI5 according to a sub-current sensing signal Vsu5 by amplifying the sub-current sensing signal Vsu5 with an adjustable gain. The shunt circuit 32 is configured to generate a sub-balance adjustment signal Scb5 at a current balance end Ncb5 according to the current amplified signal SI5 (by way of unidirectional conduction, for example). The current error amplifier 33 is configured to amplify a difference between the sub-balance adjustment signal Scb5 and the current amplified signal SI5 to generate a current error signal EI5, so as to adjust the feedback signal Vfb1.

As shown in FIG. 5, in one embodiment, the current balance end Ncb1 corresponding to the converter circuit 213 and the current balance end Ncb5 corresponding to the converter circuit 253 are coupled to each other, so that the sub-balance adjustment signal Scb1 corresponding to the converter circuit 213 and the sub-balance adjustment signal Scb5 corresponding to the converter circuit 253 are connected in a shunt manner to generate a balance adjustment signal Scb (by way of unidirectional conduction, for example). The conversion control circuit 310 and the conversion control circuit 350 adjust the corresponding feedback signal Vfb1 and the feedback signal Vfb5 according to the corresponding current error signal EI1 and the current error signal EI5, respectively, thereby controlling the corresponding modulation signal Spm1 and the modulation signal Spm5, so as to adjust the ratio of the sub-bus current Ibus1 to the sub-bus current Ibus5 to be a preset current ratio.

In one embodiment, the preset current ratio is determined according to a ratio of the adjustable gain corresponding to the converter circuit 213 to the adjustable gain corresponding to the converter circuit 253. In one specific embodiment, the preset current ratio is one. In one specific embodiment, as shown in FIG. 5, the shunt circuit 32 includes a diode, whereby one of the current amplified signal Vsu1 corresponding to the converter circuit 213 and the current amplified signal Vsu5 corresponding to the converter circuit 253, which has the higher or highest voltage, is selected as the balance adjustment signal Scb.

As illustrated by the above-mentioned embodiments, the present invention can simultaneously convert the powers of multiple external power supplies to the internal bus power, or simultaneously convert the internal bus power to the powers of multiple external power supplies by a ratio control of the sub-bus currents; besides, the sub-bus currents corresponding to the converter circuits can be balanced.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A power supply system, configured to provide a power conversion function for a system circuit, comprising:
    a first converter circuit, comprising a plurality of first switches and a first inductor, the first converter circuit being coupled to a first power through a first port of the system circuit, wherein the plurality of first switches of the first converter circuit are configured to operate the first inductor to perform power conversion between the first power and an internal bus power of the system circuit;
    a second converter circuit, comprising a plurality of second switches and a second inductor, the second converter circuit being coupled to a second power through a second port of the system circuit, wherein the plurality of second switches of the second converter circuit are configured to operate the second inductor to perform power conversion between the second power and the internal bus power of the system circuit; and
    a third converter circuit, comprising a plurality of third switches and a third inductor, wherein the plurality of third switches of the third converter circuit are configured to operate the third inductor to perform power conversion between the internal bus power of the system circuit and a third power, wherein the third power is coupled to a battery module and an internal load circuit;
    wherein an internal bus voltage of the internal bus power is configurable, and the system circuit is optionally operable in a high dropout mode;
    wherein in the high dropout mode, the internal bus voltage is configured to be greater than a first voltage of the first power, a second voltage of the second power, and a third voltage of the third power, such that an internal bus current of the internal bus power is smaller than a third current of the third power;
    wherein the first converter circuit is electrically connected to the third converter circuit by a first wire having a first preset length, and the third converter circuit is electrically connected to the internal load circuit or the battery module by a second wire having a second preset length, wherein the first preset length is greater than the second preset length.

2. The power supply system of claim 1, wherein the first preset length is at least 10 times greater than the second preset length.

3. The power supply system of claim 1, wherein in the high dropout mode, a ratio of the internal bus voltage to the third voltage is relevant to a ratio of the first preset length to the second preset length.

4. The power supply system of claim 1, wherein the third converter circuit and the internal load circuit are positioned on a main board of the system circuit, and the first converter circuit is positioned on a secondary load of the system circuit board, wherein the first converter circuit and the third converter circuit are positioned on different sides of the system circuit, wherein the main board and the secondary board are connected by a flexible circuit board or an internal connection wire, wherein a first sub-bus power generated by the first converter circuit is electrically connected to an internal bus connection end of the third converter circuit through the flexible circuit board or the internal connection wire, so as to provide the internal bus power to the third converter circuit, or to receive the internal bus power from the third converter circuit;
    wherein the first wire includes the flexible circuit board or the internal connection wire.

5. The power supply system of claim 4, wherein:
    the first converter circuit is positioned on a first side of the system circuit, and the second converter circuit is positioned on the main board and is positioned on a second side of the system circuit together with the third converter circuit, wherein the first port is positioned on the first side of the system circuit and the second port is positioned on the second side of the system circuit; or,
    the second converter circuit is positioned on the secondary board and is positioned on the first side of the system circuit together with the first converter circuit, and the third converter circuit is positioned on the second side of the system circuit, wherein the first port and the second port are positioned on the first side of the system circuit.

6. The power supply system of claim 5, wherein the second converter circuit and the first converter circuit are positioned on the first side of the system circuit, wherein the first sub-bus power generated by the first converter circuit and a second sub-bus power generated by the second converter circuit are first electrically connected to each other on the secondary board, and next electrically connected to the internal bus connection end of the third converter circuit through the flexible circuit board or the internal connection wire to generate the internal bus power.

7. The power supply system of claim 4, wherein the system circuit is a notebook computer, and the first port and the second port conform to universal serial bus (USB) type-C port, and wherein at least one of the first power, the second power and the third power is provided by a power supply device which is an electronic device compliant with the USB PD specification.

8. The power supply system of claim 4, wherein:
the plurality of first switches of the first converter circuit comprise a first high-side switch and a first low-side switch; a first end of the first inductor, a first end of the first high-side switch and a first end of the first low-side switch being commonly coupled to a first switching node, a second end of the first inductor being coupled to the first power, a second end of the first high-side switch being coupled to the internal bus power, a second end of the first low-side switch being coupled to a ground potential, wherein the first high-side switch and the first low-side switch are periodically switched complementarily according to a first duty cycle, so that the first end of the first inductor is switched between the internal bus power and the ground potential, thereby performing power conversion between the first power and the internal bus power;
the plurality of second switches of the second converter circuit comprise a second high-side switch and a second low-side switch; a first end of the second inductor, a first end of the second high-side switch, and a first end of the second low-side switch being commonly coupled to a second switching node, a second end of the second inductor being coupled to the second power, a second end of the second high-side switch being coupled to the internal bus power, a second end of the second low-side switch being coupled to the ground potential, wherein the second high-side switch and the second low-side switch are periodically switched complementarily according to a second duty cycle, so that the first end of the second inductor being switched between the internal bus power and the ground potential, thereby performing power conversion between the second power and the internal bus power;
the plurality of third switches of the third converter circuit comprise a third high-side switch and a third low-side switch; a first end of the third inductor, a first end of the third high-side switch, and a first end of the third low-side switch being commonly coupled to a third switching node, a second end of the third inductor being coupled to the third power, a second end of the third high-side switch being coupled to the internal bus power, a second end of the third low-side switch being coupled to the ground potential, wherein the third high-side switch and the third low-side switch are periodically switched complementarily according to a third duty cycle, so that the first end of the third inductor being switched between the internal bus power and the ground potential, thereby performing power conversion between the third power and the internal bus power.

9. The power supply system of claim 8, wherein in the high dropout mode:
the first power and/or the second power are step-up converted into the internal bus power by the first converter circuit and/or the second converter circuit, and the internal bus power is step-down converted into the third power by the third converter circuit, whereby the first power and/or the second power supplies power to the internal load circuit and/or the battery module; or,
the third power is step-up converted into the internal bus power by the third converter circuit, and the internal bus power is step-down converted into the first power and/or the second power by the first converter circuit and/or the second converter circuit, whereby the battery module of the system circuit supplies power to the first power, the second power, and/or the internal load circuit.

10. The power supply system of claim 8, wherein:
when a voltage difference between the first voltage and the internal bus voltage is smaller than a corresponding preset threshold, the first converter circuit operates in a bypass mode;
when a voltage difference between the second voltage and the internal bus voltage is smaller than a corresponding preset threshold, the second converter circuit operates in the bypass mode; and/or
when a voltage difference between the internal bus voltage and the third voltage is smaller than a corresponding preset threshold, the third converter circuit operates in the bypass mode;
wherein when the first converter circuit operates in the bypass mode, the plurality of first switches of the first converter circuit directly electrically connect the first voltage to the internal bus voltage; when the second converter circuit operates in the bypass mode, the plurality of second switches of the second converter circuit directly electrically connect the second voltage to the internal bus voltage; and when the third converter circuit operates in the bypass mode, the plurality of third switches of the third converter circuit directly electrically connect the third voltage to the internal bus voltage.

11. The power supply system of claim 10, wherein:
when the first converter circuit operates in the bypass mode, the first high-side switch is constantly turned on, or the first converter circuit further comprises a first bypass switch coupled between the first power and the internal bus power, and the first bypass switch is turned on in the bypass mode;
when the second converter circuit operates in the bypass mode, the second high-side switch is constantly turned on, or the second converter circuit further comprises a second bypass switch coupled between the second power and the internal bus power, and the second bypass switch is turned on in the bypass mode; and/or
when the third converter circuit operates in the bypass mode, the third high-side switch is constantly turned on, or the third converter circuit further comprises a third bypass switch coupled between the third power and the internal bus power, and the third bypass switch is turned on in the bypass mode.

12. The power supply system of claim 4, wherein the internal bus power comprises the first sub-bus power generated by the first converter circuit and a second sub-bus power generated by the second converter circuit, wherein the power supply system further comprises a control circuit for controlling a ratio between a first sub-bus current of the first sub-bus power and a second sub-bus current of the second sub-bus power to be a preset current ratio according to a first current sensing signal and a second current sensing signal, wherein the first current sensing signal is relevant to a first inductor current of the first inductor, and the second current sensing signal is relevant to a second inductor current of the second inductor.

13. The power supply system of claim 12, wherein the preset current ratio is relevant to a first rated power of the first power and a second rated power of the second power, wherein the first port and the second port are ports conforming to USB type-C specification, wherein the first power and the second power are respectively provided by a first power supply and a second power supply, wherein the first rated power and the second rated power are obtained by communicating with the first power supply and the second power supply through a configuration channel of the first port and a configuration channel of the second port, respectively.

14. The power supply system of claim 12, wherein each of the first converter circuit and the second converter circuit further comprises a conversion control circuit, wherein the conversion control circuit comprises:
 a feedback circuit, configured to generate a feedback signal according to a sub-bus power;
 a modulation error amplifier, configured to amplify a difference between the feedback signal and a reference signal to generate a modulation error signal;
 a pulse width modulation circuit, configured to generate a modulation signal in a pulse width modulation manner according to the modulation error signal, so as to control the corresponding plurality of switches;
 a gain-adjustable amplifying circuit, configured to generate a current amplified signal according to a sub-current sensing signal by amplifying the sub-current sensing signal with an adjustable gain;
 a shunt circuit, configured to generate a sub-balance adjustment signal at a current balance end according to the current amplified signal; and
 a current error amplifier, configured to amplify a difference between the sub-balance adjustment signal and the current amplified signal to generate a current error signal, so as to adjust the feedback signal;
 wherein the sub-bus power and the sub-current sensing signal corresponding to the first converter circuit are the first sub-bus power and the first current sensing signal, respectively;
 wherein the sub-bus power and the sub-current sensing signal corresponding to the second converter circuit are the second sub-bus power and the second current sensing signal, respectively;
 wherein the current balance end corresponding to the first converter circuit and the current balance end corresponding to the second converter circuit are coupled to each other, so that the sub-balance adjustment signal corresponding to the first converter circuit and the sub-balance adjustment signal corresponding to the second converter circuit are connected in a shunt connection to generate a balance adjustment signal, wherein each of the conversion control circuits adjusts the corresponding feedback signal according to the corresponding current error signal, thereby controlling the modulation signal corresponding to each of the conversion control circuits to adjust the ratio between the first sub-bus current and the second sub-bus current to be the preset current ratio;
 wherein the preset current ratio is determined according to a ratio of the adjustable gain corresponding to the first converter circuit to the adjustable gain corresponding to the second converter circuit.

15. The power supply system of claim 14, wherein the shunt circuit comprises a diode, one of the current amplified signal corresponding to the first converter circuit and the current amplified signal corresponding to the second converter circuit, which has the highest voltage, is selected as the balance adjustment signal.

16. The power supply system of claim 12, wherein the preset current ratio is one.

* * * * *